(12) United States Patent
Suzuki et al.

(10) Patent No.: US 9,989,115 B2
(45) Date of Patent: Jun. 5, 2018

(54) DISC BRAKE SYSTEM

(71) Applicant: Akebono Brake Industry Co., Ltd., Chuo-ku, Tokyo (JP)

(72) Inventors: Michio Suzuki, Walled Lake, MI (US); Aurelian Bahmata, South Lyon, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 0 days. days.

(21) Appl. No.: 15/248,134

(22) Filed: Aug. 26, 2016

(65) Prior Publication Data

US 2018/0058524 A1   Mar. 1, 2018

(51) Int. Cl.
| | | |
|---|---|---|
| *F16D 65/18* | (2006.01) | |
| *F16D 55/225* | (2006.01) | |
| *F16D 65/00* | (2006.01) | |
| *F16D 55/00* | (2006.01) | |
| *F16D 121/04* | (2012.01) | |
| *F16D 121/24* | (2012.01) | |
| *F16D 125/36* | (2012.01) | |

(Continued)

(52) U.S. Cl.
CPC ........... *F16D 65/18* (2013.01); *F16D 55/225* (2013.01); *F16D 65/0068* (2013.01); *F16D 2055/0016* (2013.01); *F16D 2121/04* (2013.01); *F16D 2121/24* (2013.01); *F16D 2123/00* (2013.01); *F16D 2125/06* (2013.01); *F16D 2125/36* (2013.01)

(58) Field of Classification Search
CPC .... F16D 65/0068; F16D 55/225; F16D 65/14; F16D 65/18
See application file for complete search history.

(56) References Cited

U.S. PATENT DOCUMENTS 3,285,372 A * 11/1966 Rossmann .............. F16D 55/46
                                                  188/72.2
3,835,960 A *  9/1974 Moss .................... F16D 55/227
                                                  188/106 F
3,835,961 A    9/1974 Troester et al.
(Continued)

FOREIGN PATENT DOCUMENTS

DE     1959081 A1    6/1971
DE     3332548 A1    3/1985
(Continued)

OTHER PUBLICATIONS

European Search Report for European patent application No. EP17168945.8, dated Dec. 7, 2017.

*Primary Examiner* — Thomas J Williams
*Assistant Examiner* — James K Hsiao
(74) *Attorney, Agent, or Firm* — The Dobrusin Law Firm, P.C.

(57) ABSTRACT

A brake system including a piston brake system and an integral parking brake system. The brake system includes a brake piston having a piston bore, and a brake pad. The parking brake system includes a rotary to linear stage mechanism located at least partially within the piston bore. During a brake apply, the brake piston and the brake pad are moved against a brake rotor to create a clamp force. During a parking brake apply, the rotary to linear stage mechanism transfers torque into a linear force to move the same brake piston and the same brake pad against the brake rotor to create a clamp force.

20 Claims, 4 Drawing Sheets

(51) Int. Cl.
*F16D 123/00* (2012.01)
*F16D 125/06* (2012.01)

(56) References Cited

U.S. PATENT DOCUMENTS

| | | | | |
|---|---|---|---|---|
| 4,719,997 | A | * | 1/1988 | Tsuruta .............. F16D 65/18 |
| | | | | 188/106 F |
| 4,784,245 | A | * | 11/1988 | Fabbro .............. F16D 65/567 |
| | | | | 188/196 D |
| 5,038,895 | A | * | 8/1991 | Evans ............... F16D 65/567 |
| | | | | 188/106 F |
| 5,172,792 | A | * | 12/1992 | Cartwright ......... F16D 55/227 |
| | | | | 188/71.1 |
| 6,382,368 | B2 | | 5/2002 | Iwata et al. |
| 8,851,241 | B2 | * | 10/2014 | Pericevic .......... F16D 65/18 |
| | | | | 188/196 A |
| 2002/0003067 | A1 | | 1/2002 | Iwata et al. |
| 2008/0283345 | A1 | | 11/2008 | Balz et al. |
| 2012/0292141 | A1 | | 11/2012 | Takahashi |
| 2013/0075205 | A1 | * | 3/2013 | Sakashita .......... F16D 65/18 |
| | | | | 188/72.3 |
| 2014/0131147 | A1 | * | 5/2014 | Schnur ............. F16D 55/14 |
| | | | | 188/71.5 |
| 2015/0129371 | A1 | * | 5/2015 | Gutelius ........... F16D 65/18 |
| | | | | 188/72.6 |
| 2015/0219171 | A1 | | 8/2015 | Kawamata et al. |
| 2015/0323026 | A1 | * | 11/2015 | Yasui ............... F16D 65/18 |
| | | | | 188/72.7 |
| 2017/0058979 | A1 | | 3/2017 | Bahmata et al. |

FOREIGN PATENT DOCUMENTS

| | | |
|---|---|---|
| EP | 2937599 A1 | 10/2015 |
| EP | 3128199 A1 | 2/2017 |
| GB | 1156277 A | 6/1969 |
| JP | H0960667 A | 3/1997 |
| JP | 2002021892 A | 1/2002 |
| JP | 2007177995 A | 7/2007 |
| JP | 2011158058 A | 8/2011 |
| JP | 2012246988 A | 12/2012 |
| JP | 2015124811 A | 7/2015 |
| JP | 2015124812 A | 7/2015 |
| WO | 92/20937 A1 | 11/1992 |
| WO | 2007/051809 A1 | 5/2007 |
| WO | 2014/024313 A1 | 2/2014 |
| WO | 2015/098780 A1 | 7/2015 |
| WO | 2015/152074 A1 | 10/2015 |
| WO | 2017/032988 A1 | 3/2017 |

* cited by examiner

DISC BRAKE SYSTEM

FIELD

These teachings generally relate to an opposed piston disc brake system and parking brake system.

BACKGROUND

An opposed piston disc brake system includes one or more brake pistons and brake pads located on each side of a brake rotor. During a standard brake apply, the opposing brake pistons are moved towards one another, which causes the opposing brake pads to move into contact with both sides of the brake rotor to create a clamp force to slow or stop a moving vehicle.

Typical parking brake systems on opposed piston disc brake systems include a drum-style brake system, such as a drum-in-hat system for example. Some opposed piston disc brake systems include an additional and separate parking brake system that may be a spot caliper, such as a sliding caliper parking brake or electric parking brake.

It may be desirable to improve the state of the art by providing an improved disc brake system and parking brake system. For example, it may be desirable to have an opposed disc brake system with a parking brake system other than a drum-style brake system. It may be desirable to have a disc brake system with a parking brake system other than an additional, separate caliper like a spot caliper. For example, it may be desirable to have an opposed piston disc brake system that includes a parking brake system that uses one or more components of the disc brake system to create a clamp force during a parking brake apply. This may result in increased packing space and decreased cost and weight.

SUMMARY

These teachings provide an improved disc brake system and parking brake system. These teachings provide an opposed disc brake system with a parking brake system other than a drum style brake system. These teachings provide a mechanically actuated parking brake system for an opposed piston disc brake system. These teachings provide an opposed piston disc brake system that includes an integrated parking brake system that uses one or more components of the disc brake system to create a clamp force during a parking brake apply.

For example, these teachings provide a parking brake system that moves a brake piston to create a clamp force during a parking brake apply; the same brake piston is also used by the opposed piston disc brake system as a service brake to create a clamp force during normal braking for slowing, stopping, or preventing movement of a vehicle. For example, these teachings provide a parking brake system that moves one or more brake pads to create a clamp force during a parking brake apply; the same one or more brake pads are also used by the opposed piston disc brake system as a service brake to create a clamp force during normal braking for slowing, stopping, or preventing movement of a vehicle. These teachings provide a parking brake system that includes an adjuster that compensates for brake pad wear during normal use of the service brake. These teachings improve the state of the art by requiring fewer components to be used for the parking brake system, which results in increased packing space and decreased cost and weight.

DETAILED DESCRIPTION

The teachings herein provide a brake system. The brake system may function to create a clamp force to slow, stop, and/or maintain a vehicle in a stopped or parked position. The brake system may be any type of brake system. For example, the brake system may be an opposing brake system (i.e., a fixed caliper brake system). These teachings can also relate to a floating brake system (i.e., a floating caliper). The brake system may be a service brake. The brake system may generally include a brake rotor, opposing brake pads, and a brake caliper supporting one or more brake pistons.

The clamp force may be any force that, when coupled with a brake pad coefficient of friction, functions to create drag to decelerate, slow, stop, and/or prevent movement or rotation of a brake rotor and/or a vehicle. The clamp force may be created during a standard brake apply (i.e., a brake apply force). The clamp force may be created during a parking brake apply (i.e., a parking brake force). One or more brake pads may be used to create the clamp force. The same one or more brake pads are used to create the clamp force during application of the service brake and during application of the parking brake. The clamp force can be created by converting the kinetic energy of the vehicle into thermal energy by frictionally engaging one or more brake pads with one or more sides of the brake rotor.

The one or more brake pads may include a friction material and a pressure plate. The one or more brake pads may be supported on the brake caliper so that the friction material faces a side of the brake rotor. The pressure plate may oppose the friction surface. One or more brake pistons, one or more fingers, or both may face and/or may be in communication with the pressure plates of a corresponding brake pad. The one or more brake pads may be moveably supported on pins. For example, one pin may support corresponding ends of the inboard and outboard brake pads, and another pin may support the other corresponding ends of the inboard and outboard brake pad. For example, one or more brake pistons may be in contact with the pressure plate of an inboard brake pad, one or more brake pistons may be in contact with the pressure plate of an outboard brake pad, one or more fingers may be in contact with the pressure plate of an inboard brake pad, one or more fingers may be in contact with the pressure plate of an outboard brake pad, or a combination thereof. During a standard brake apply, or while applying the parking brake, the one or more brake pistons and/or the one or more fingers may push, pull, or otherwise move all or an end of a corresponding brake pad so that the corresponding friction material engages a corresponding side of the brake rotor to create the clamp force.

The brake rotor may cooperate with the components of the brake system, the parking brake system, or both to create the clamp force. The brake rotor may include an inboard side and an opposing outboard side. One or more brake pads may be located at the inboard side of the brake rotor (i.e., inboard brake pads), and one or more brake pads may be located at the outboard side of the brake rotor (i.e., outboard brake pads).

The brake caliper may have one or more caliper bores. Each caliper bore may define a hollow region in the brake caliper. The caliper bore may be adapted to receive and support a corresponding brake piston. One or more caliper bores can be located on each side of the brake rotor. A brake piston supported within a caliper bore may be moved along an axis of the caliper bore to create or release a clamp force during application of the service brake, the parking brake, or both.

The one or more brake pistons may function to move a brake pad, or a corresponding end of brake pad, towards the brake rotor to create the clamp force. During a brake apply to decelerate or stop a vehicle, the brake pistons may be moved by pressurizing a fluid, such as brake fluid. To release the clamp force or the brake apply, the brake piston can be moved by depressurizing the fluid. During a parking brake apply, to create clamp force, the same brake piston used during a brake apply may be moved by moving a corresponding rotary to linear stage mechanism in an apply direction. To release the clamp force or the parking brake, the brake piston can be moved by moving the corresponding rotary to linear stage mechanism in an opposing release direction. During both a parking brake apply and a standard brake apply, the brake piston may be moved along a brake piston axis, which may be collinear or essentially collinear with the piston bore axis. The brake piston may include a closed end selectively engaging the pressure plate of a brake pad, and an open end defining an opening into a piston bore.

The piston bore may function to receive at least a portion of the parking brake system. The piston bore may receive at least a portion of the rotary to linear stage mechanism, the adjuster, or both. One or more of the brake pistons may include a piston bore. Some of the brake pistons may be free of a piston bore. Any of the brake pistons having a piston bore may receive a rotary to linear stage mechanism, the adjuster, or both. In other words, more than one brake piston may also be part of the parking brake system. Accordingly, the parking brake system may have more than one rotary to linear stage mechanism on one side or both sides of the brake rotor.

The piston bore may be a cup or recess formed into an end of a brake piston. The piston bore may include a surface at or near a bottom wall or end of the piston bore. A gap may be defined between a corresponding surface on the nut sleeve and the surface at the bottom wall. During a parking brake apply, the gap may be taken up by moving the rotary to linear stage mechanism an apply direction towards the inboard brake pad. Once the gap is taken up, further movement of the rotary to linear stage mechanism or nut sleeve may cause the rotary to linear stage mechanism to press against the bottom wall and then move the brake piston and the brake pad against the brake rotor to create the clamp force.

A parking brake system may be added to, or integrated with the brake system. Integrated or integral may mean that the parking brake system uses one or more components of the brake system to create the clamp force during a parking brake apply. For example, the parking brake system may utilize one or more brake pads, one or more brake pistons, or a combination thereof of the brake system that are typically used to create the clamp force during a standard brake apply (e.g., service brake) to also create the clamp force during a parking brake apply. Integrated may mean that one or more components of the parking brake system are included in the brake system. For example, one or more components of the parking brake system may be located in the brake caliper, one or more brake pistons, or a combination thereof and one or more components of the parking brake system can be located in the body of the parking brake system. For example, at least a portion of the adjuster, the rotary to linear stage mechanism may be integrated with or into the bake piston of the brake system.

The parking brake system may be removeably attached to the brake system (e.g., to the caliper). The brake system and/or brake caliper may include one or more pins, bolts, sliders, surfaces, components, and/or any other suitable features, or a combination thereof that cooperate with one or more mating features on the parking brake system on which the parking brake system is attached and/or is able to move along during a parking brake apply. For example, the body of the parking brake system may include one or more bosses, pin holes, surfaces, components, and/or any other suitable features that cooperate with the features on the brake caliper and/or brake system. The parking brake system may be integrated with or into the inboard and outboard trailing brake pistons; the inboard or outboard leading brake pistons; or a combination thereof.

The parking brake system may function to create a clamp force to maintain a vehicle in a stopped or parked position. The parking brake system may utilize one or more components of the brake system to create the clamp force. For example, during a parking brake apply, the parking brake system may be adapted to move one or more of the brake pistons and brake pads against the brake rotor to create the clamp force. The parking brake system may be adapted to move the one or more brake pistons and brake pads away from the brake rotor to release the clamp force. The parking brake system may include an actuator; a body with a bridge and fingers; a ball ramp assembly; a rotary to linear stage mechanism; and an adjuster.

The parking brake system may include one or more actuators. The actuator may be moved to provide torque to the rotary to linear stage mechanism. The actuator may be moved to provide torque to rotate the rotary to linear stage mechanism, the ball ramp assembly, or both. The actuator may function to create, begin, turn ON, or "actuate" the parking brake system or apply. Movement or rotation of the actuator may function to move the rotary to linear stage mechanism, a spindle, a shaft, the ball ramp assembly, one or more brake pistons, one or more brake pads, the fingers, or a combination thereof to create and/or release the clamp force. The actuator may be moved or rotated by a cable pull. Preferably, the actuator may be moved or rotated by a user manually manipulating a cable or a lever.

However, in some embodiments the actuator may be moved or pulled by other means, such as with a motor or motor gear unit, for example. The motor or motor gear unit may be attached to the brake system, the parking brake system, or attached to a remote location on the vehicle (e.g., chassis). The motor or motor gear unit may be in communication with a gear train that may increase or decrease a power or torque output from the motor. The actuator may be moved or rotated on demand when a user wishes to apply the parking brake system. The actuator may be moved or rotated to apply the parking brake automatically after a vehicle is stopped, put in park, and/or turned OFF. The actuator may be moved or rotated to disengage or turn OFF the parking brake automatically after a vehicle is in gear and/or turned ON.

The parking brake system may include a body. The body may include a bridge and one or more fingers. The body, the bridge, the fingers, or a combination thereof may move or slide during a parking brake apply, parking brake release, or both. The bridge and fingers may function to move one of the brake pads against the brake rotor to create the clamp force. The bridge and fingers may function like a bridge and fingers of a floating disc brake system that move an outboard brake pad against a brake rotor during a brake apply to create a clamp force. For example, when the inboard brake pad is moved against the brake rotor to create clamp force during a brake apply or a parking brake apply, the force may cause the bridge and fingers to move in an opposing direction so that the fingers can pull the outboard brake pad against the brake rotor. The bridge and fingers may be moveably supported on pins or other suitable features on the brake, caliper so that the bridge and fingers can move to move the brake pad against the brake rotor during a parking brake apply. The fingers may be in direct communication with the pressure plate of the outboard brake pad or a bracket located between the pressure plate and fingers. The body, the bridge, and/or the fingers may be a single, integral component, or one or more of the body, the bridge, and/or the fingers may be individual components that are jointed together via one or more suitable fasteners. The bridge may be located between the opposed bridges of the caliper body of the brake system.

The parking brake system may include one or more brackets. The bracket may function to distribute a moving force of the fingers on the pressure plate. The bracket may include arms that may function to engage the fingers of the body of the parking brake system. The bracket may be in contact with the pressure plate of a brake pad. The bracket may be secured to the pressure plate or shim of a brake pad so that the shim does not move relative to the brake pad. The bracket may be integrally formed with a shim or pressure plate. The bracket may be in contact with the brake piston so that during a parking brake apply the bracket moves the brake piston, the brake pad, or both against the brake rotor. The bracket may at least partially surround at least one of the brake pistons. The bracket may at least partially surround the brake piston that opposes that brake piston used by the parking brake system to apply the parking brake (i.e., the brake piston that at least partially receives components of the parking brake system).

The parking brake system may include one or more rotary to linear stage mechanisms. The rotary to linear stage mechanism may function to receive a rotary force or torque and transfer the rotary force or torque into an axial or linear force. The rotary to linear stage mechanism may move a brake piston so that the brake piston moves a brake pad. The rotary to linear stage mechanism may be a linear actuator. The rotary to linear stage mechanism may be an actuator. The rotary to linear stage mechanism may include a spindle and a nut. The rotary to linear stage mechanism may be at least partially located within a brake piston of the brake system. The rotary to linear stage mechanism may be at least partially located within the body of the parking brake system. The rotary to linear stage mechanism may include one or more ball screws, roller screws, or a combination thereof. Exemplary ball screws may utilize ball bearings as load transfer elements between the nut and spindle or screw. During movement of the ball screw, the ball bearings may circulate along races or grooves between the spindle and the nut. A roller screw or planetary screw may be similar to a ball screw except that roller screws use rollers as the load transfer elements between nut and screw. The load on a ball screw, the roller screw, or both is distributed over a large number of ball bearings or rollers, via roller threads, respectively, so that each ball bearing or roller, when subjected to force, may roll, and therefore, friction is reduced, which may equate to high efficiency. Accordingly, less force or torque may be required to move a spindle and nut in a ball screw or roller screw in an apply direction, a release direction, or both.

The rotary to linear stage mechanism may he may be one or more high efficiency devices, one or more low efficiency devices, or both. A high efficiency device is a device that is more efficient than a low efficiency device. Efficiency may refer to how well, or how "efficiently" the device converts or transfers torque or a rotational load input form a motor or MGU into a linear load or output force. Dependig on one or more considerations, such as lead angle and coefficient of friction, the one, or more high efficiency devices may have an efficiency on the order of approximately 60% or more, approximately 70% or more, approximately 80% or more, approximately 85% or more, approximately 90% or more, approximately 95% or more, 97% or more, or even 99% or more.

The parking brake system may include one or more ball ramp assemblies. The ball ramp assembly may function to create the clamp force. The ball ramp assembly may function to create the clamp forced during a brake apply, a parking brake apply, or both. The ball ramp assembly may include a rotating side (e.g., the first ramp plate) and a stationary side (i.e., the second ramp plate) with rolling elements or balls interposed there between. Each ramp plate includes corresponding ramps each having a deep end and a shallow end. When the rotating side or first ramp plate is rotated such that the balls move from the deep end to the shallow end of the ramp, the rolling elements provide an axial force against the stationary side or second ramp plate which causes the first ramp plate to also move axially from the second ramp plate. The ball and ramp assembly may be located between the adjuster and the spindle. The ball and ramp assembly may be located between the nut and a bottom surface of the brake piston.

The parking brake system may include one or more adjusters. The adjuster may function to compensate for brake pad wear of the inboard brake pad, the outboard brake pad, or both. The adjuster may function to move or adjust a position of the spindle, the nut, or both so that over time as the brake pad linings or friction materials wear, the distance that the nut sleeve must move the brake piston to create drag or clamp force is the same. The adjuster may function to rotationally displace the spindle from within the nut sleeve as the brake pads wear. The adjuster may include a compression spring and a locking ring that may cooperate to maintain an axial position of the nut sleeve relative to the inboard brake pad. The compression spring and snap ring may cooperate to restrict axial movement of the nut sleeve beyond a predetermined position in a direction away from the inboard brake pad. The adjuster may be at least partially located within a brake piston of the brake system. The adjuster may include a spring case or housing that maintains the compression spring in compression. The spring case may include one or more feet, fingers, clips, or features that engage the body of the parking brake system to maintain compression of the spring against the spindle.

The adjuster may function to move or adjust a position of the spindle and the nut relative to the brake piston, or relative to the bottom surface of the piston pocket. The adjuster may preferably adjust this position during normal application of the service brake (e.g., during creation of the clamp force during a standard brake apply). This advantageously ensures that the parking brake can be set or applied when the actuator cable is manually pulled regardless of the amount of brake pad wear. In other words, over time as the friction material of the brake pads wear, the brake pads and the brake pistons are repositioned and moved closer to the brake rotor. If the position of the nut is not moved, or is not adjusted relative to the bottom surface of the piston pocket during this brake piston repositioning, the gap between the piston pocket and the nut will increase. Then, when a user desires to apply the parking brake assembly by manually pulling the parking brake cable, the distance that the nut is moved may not be enough for the nut to cover the gap between the nut and the bottom wall of the piston pocket and/or may not be enough to move the brake piston and the brake pad against the brake rotor to create the clamping force, which may result in the parking brake system may not being properly set. This is because the distance that the nut can be axially moved during application of the parking brake is limited by the distance that the cable can be pulled and/or by the size of the ball in ramp mechanism. Such a condition may not be readily appreciated in systems that use other means to apply the parking brake, such as an electric motor for example. That is because the electric motor is not limited like the parking brake cable is. In other words, the motor can continue to rotate to move the nut to cover the gap between the nut and the bottom wall of the piston pocket and then move the brake piston and brake pad against the brake rotor to create the parking brake force. Therefore, an adjuster may not be required in systems that use other means than a cable pull to apply the parking brake.

Figure 1:
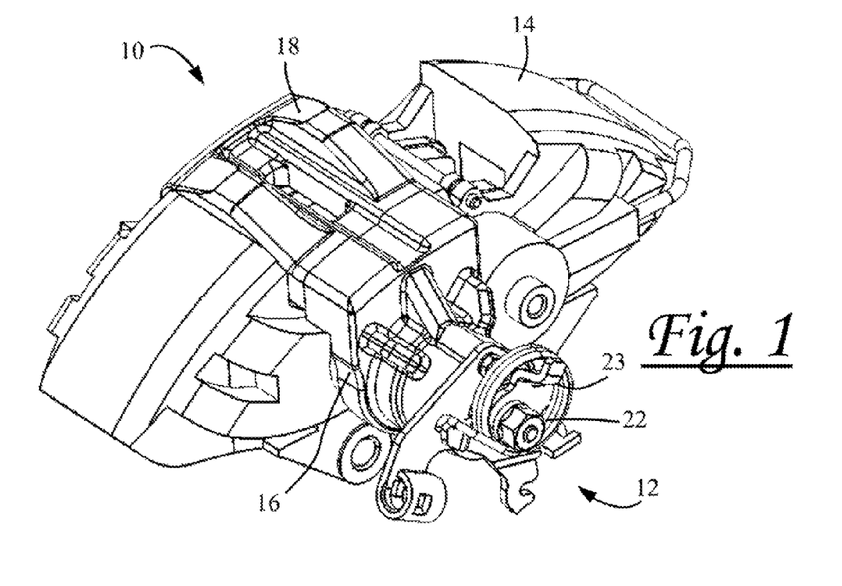
FIG. 1 is a perspective view of a brake system and a parking brake system.
Figure 2:
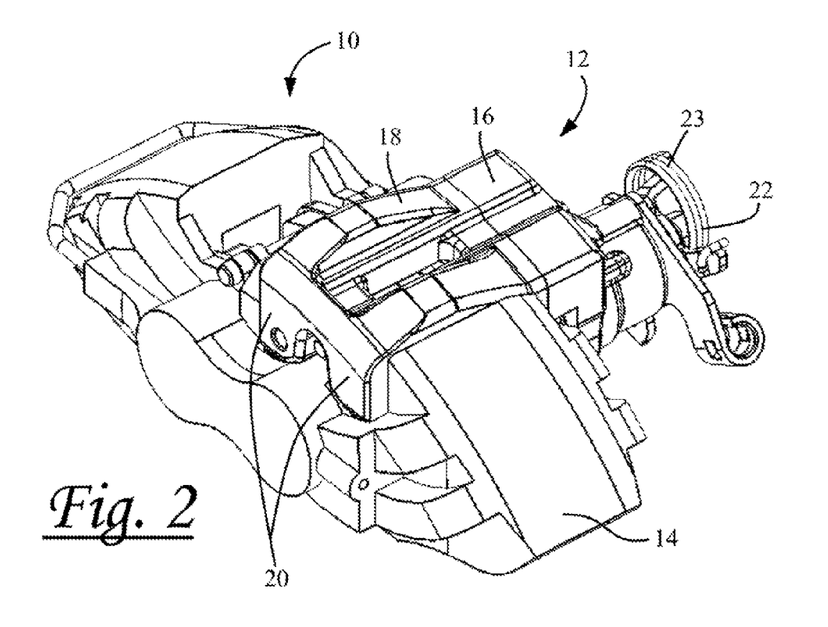
FIG. 2 is another perspective view of the brake system and parking brake system of FIG. 1.

FIGS. 1 and 2 illustrate a brake system 10 and a parking brake system 12. The brake system 10 includes a caliper 14. The parking brake system 12 includes a body 16, a bridge 18, fingers 20, and an activation mechanism 22. The activation mechanism comprises a helical spring 23.

Figure 3:
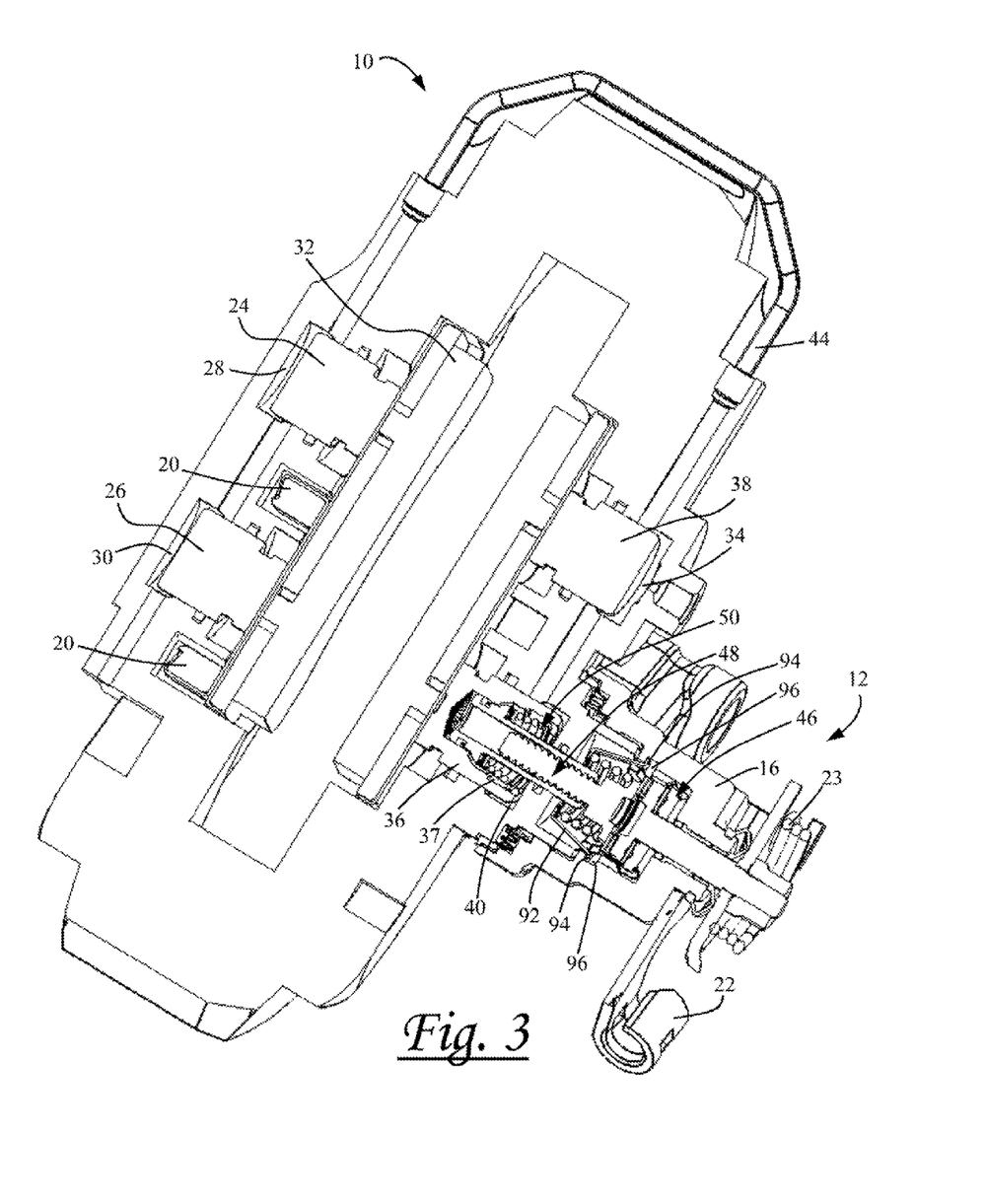
FIG. 3 is a perspective, cross-sectional view of the brake system and parking brake system of FIGS. 1 and 2.

FIG. 3 is a cross section of the brake system 10 and parking brake system 12 of FIGS. 1 and 2. The brake system 10 includes a pair of outboard brake pistons 24, 26 supported in respective caliper bores 28, 30. The outboard brake pistons 24, 26 are in communication with the outboard brake pad 32. The brake system 10 includes a pair of inboard brake pistons 34, 36 supported in respective caliper bores 38, 40. The inboard brake pistons 34, 36 are in communication with the inboard brake pad 42. A brake fluid line 44 is in communication with a source of brake fluid and the caliper bores 28, 30, 38, and 40. The fingers 20 of the parking brake system are in communication with the outboard brake pad 32. The parking brake system 12 includes a ball ramp assembly 46, a rotary to linear stage mechanism 48, and an adjuster 50. The rotary to linear stage mechanism 48 and the adjuster 50 are at least partially received in a piston bore 37 of the brake piston 36.

Figure 4:
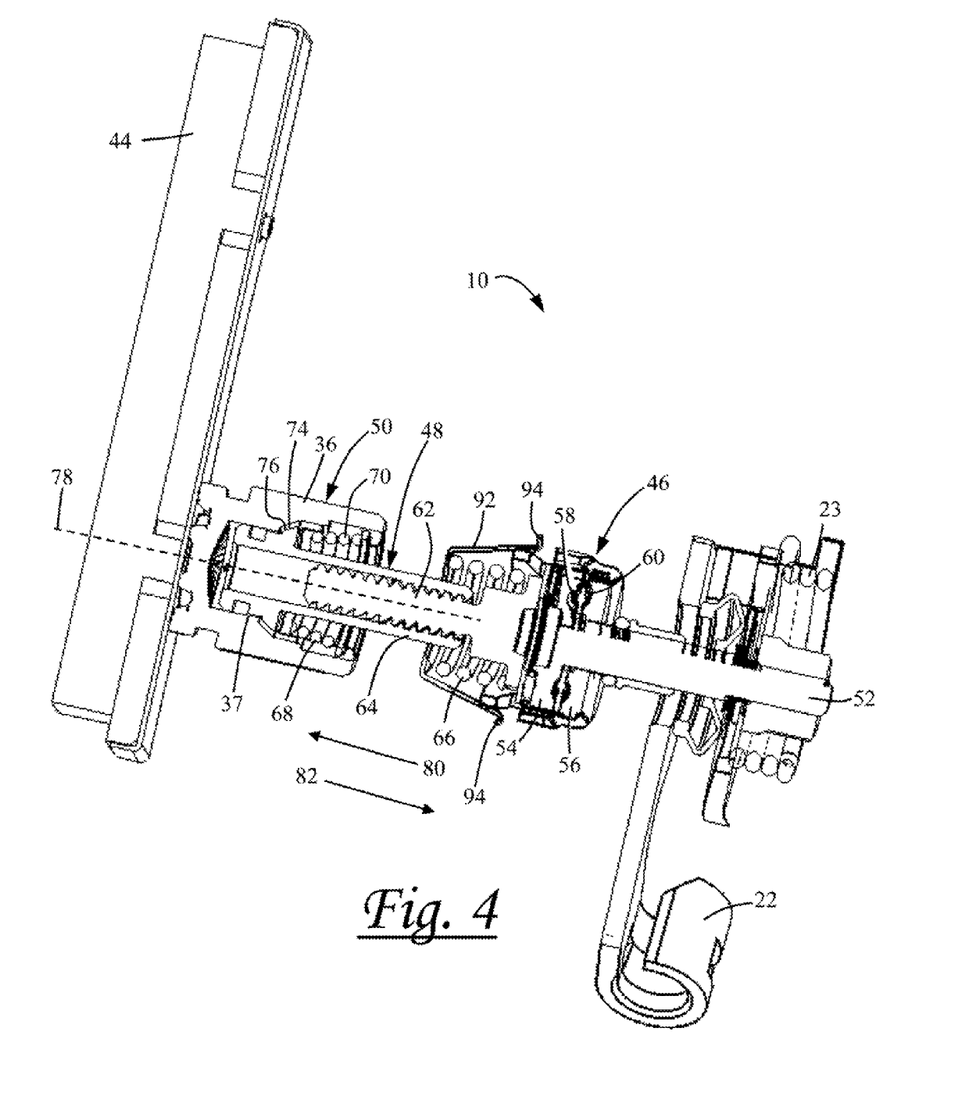
FIG. 4 is a perspective cross-sectional view of the parking brake system of FIGS. 1-3.

Referring to FIG. 4, the ball ramp assembly 46 includes a shaft 52 in communication with both the activation mechanism 22 and a first ramp plate 54; and a second ramp plate 56 in communication with the first ramp plate 54. The first ramp plate 54 includes at least one ramp 58 that corresponds with at least one ramp 60 on the second ramp plate 56. A ball is supported between each of the corresponding ramps 58, 60.

The rotary to linear stage 48 includes a spindle 62 in communication with the ball ramp assembly 46, and a nut sleeve 64 in communication with the spindle 62. A preload is applied on the spindle 62 in direction 82 via a compression spring 66 that is maintained in compression against the spindle 62 with a spring case 92. The spring case 92 includes tabs 94 that engage a groove 96 located in the body 16 (See FIG. 3) thus compressing the spring between the spring case 92 and a flange on the spindle 62. The nut sleeve 64 includes a surface 74 that opposes and corresponds to a surface 76 of the piston bore 37 of the brake piston 36.

The adjuster 50 includes a compression spring 68 that applies a preload on the nut sleeve 64 in direction 82, and a snap ring 70 in communication with the piston bore 37 the brake piston 36.

Referring to FIGS. 1-3, during a standard brake apply, brake fluid is pressurized and circulated through the brake fluid line 44 and directed into the caliper bores 28, 30, 38, and 40. The pressurized brake fluid causes the outboard brake pistons 24, 26 to move the outboard brake pad 32 into contact with a side of the brake rotor and the inboard brake pistons 34, 36 to move the inboard brake pad 42 into communication with an opposing side of the brake rotor. Pressing the brake pads 32, 42 against the brake rotor creates drag or a clamp force, which functions to slow er stop a moving vehicle. To release the brake apply, the brake fluid is depressurized and, accordingly, the brake pistons 24, 26, 34, 36, move away from the corresponding brake pads 32, 42 so that the brake pads 32, 42 move away from the brake rotor. Accordingly, the drag and the clamp force are eliminated and the brake rotor and the vehicle are free to move again.

Referring to FIGS. 1-4, to apply the parking brake, the activation mechanism 22 is moved in an apply direction by pulling a cable (not illustrated) and tensioning the spring 23 which causes the shaft 52 and the first ramp plate 54 to rotate in an apply direction. Rotation of the first ramp plate 54 in the apply direction causes the spindle 62 to rotate in an apply direction. Rotation of the spindle 62 in the apply direction causes the nut sleeve 64 to axially move in an apply direction 80 towards the inboard brake pad 44. The nut sleeve 64 is axially moved in direction 80 until the surface 74 of the nut sleeve 64 contacts the surface 76 of the piston bore 37. Alter contact at the surfaces 74, 76 is made, further movement of the nut sleeve 64 in direction 80 moves the brake piston 36 in direction 80 towards the inboard brake pad 44 until contact is made there between. Further movement of the brake piston 36 in direction 80 moves the inboard brake pad 44 into contact with a side of the brake rotor to create the clamp force. As the inboard brake pad 44 is moved against the brake rotor, the body 16 and the bridge 18 are moved in direction 82 so that the fingers 20 pull the outboard brake pad 32 into contact with the opposing side of the brake rotor to create the clamp force. As the clamp force increases, load on the brake piston 36 and nut sleeve 64 increases, which increases load on the ball ramp assembly 46. The increased, load on the ball ramp assembly 46 causes each ball to move up the corresponding ramps 58, 60 so that the first ramp plate 54 separates from the second ramp plate 56. Axial movement of the first ramp plate 54 away from the second ramp plate 56 causes the spindle 62, the nut sleeve 64, and the brake piston 36 to move axially in direction 80 so that inboard brake pad 44 (and, correspondingly, also the outboard brake pad 32) is further pressed against the brake rotor thus increasing the clamp force. Movement of the first ramp plate 54 away from the second ramp plate 56 also causes compression of the compression spring 66 in direction 80.

With continued reference to FIGS. 1-4, to release the parking brake, the activation mechanism 22 is moved in a release direction by releasing tension in the spring 23, which causes the shaft 52 and the first ramp plate 54 to rotate in a release direction thus reducing the load on the ball ramp assembly 46. Accordingly, the first ramp plate 54 rotates in a release direction, which allows each ball to move down the corresponding ramps 58, 60. The compression spring 66 resiliently moves the first ramp plate 54 back towards the second ramp plate 56 in direction 82. Rotation of the first ramp plate 54 in the release direction causes the spindle 62 to rotate in the release direction, which causes the nut sleeve 64 to axially move in direction 82 away from the inboard brake pad 44. The brake piston 36 moves away from the inboard brake pad 44 and the clamp force is reduced. As the inboard brake pad 44 is moved away from the brake rotor, the body 16 and the bridge 18 are moved in direction 80 via a suitable retraction mechanism such as a spreader spring or a retraction clip so that the outboard brake pad 32 is moved out of contact with the opposing side of the brake rotor.

Over time, as the lining of the brake pads 42, 44 wear, the adjuster 50 compensates for the wear by adjusting the position of the spindle 62 relative to the nut sleeve 64. That is, the compression spring 68 maintains an axial position of the nut sleeve 64 by restricting the nut sleeve 64 from moving too far in direction 82. Instead, over time as the linings of the brake pads wear, the spindle 62 is rotationally withdrawn out of the nut sleeve 64 in direction 82 so that the distance the nut sleeve 64 is axially moved in direction 80 to create the clamp force remains generally the same as the brake pads wear.

Figure 5:
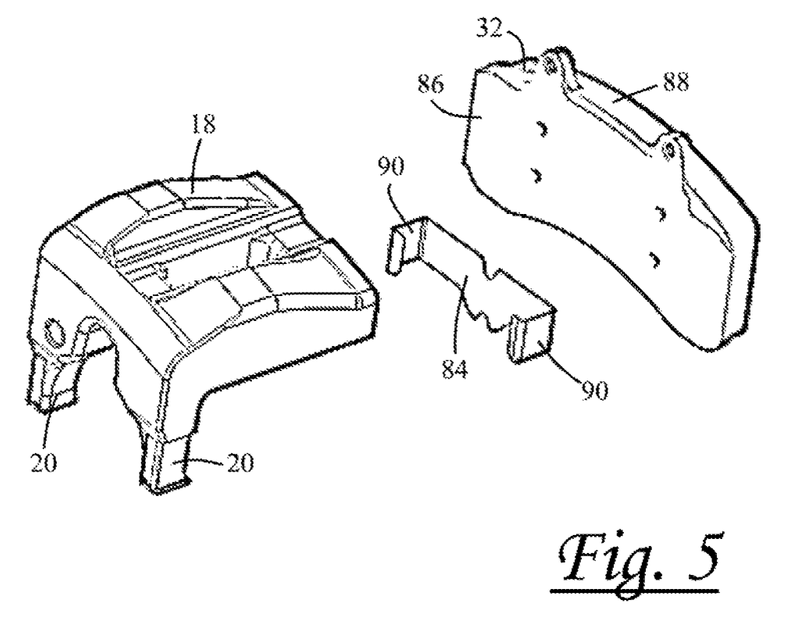
FIG. 5 is a perspective view of the fingers, bridge, outboard brake pad, and bracket of FIGS. 1-4.

FIG. 5 illustrates the fingers 20, the bridge 18, the outboard brake pad 32 including a pressure plate 86 and friction portion 88, and a bracket 84. The bracket 84 is positioned against the pressure plate 86 of the outboard brake pad 32. The bracket 84 includes arms 90 that engage the corresponding fingers 20.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations, of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A brake system comprising:
an opposed piston brake system comprising:
  i. a brake piston; and
  ii. a brake pad;
a parking brake system comprising:
  i. a rotary to linear stage mechanism in communication with the brake piston, the rotary to linear stage mechanism comprises a spindle and a nut sleeve, rotation of the spindle causes the nut sleeve to move axially;
  ii. an adjuster;
wherein during a parking brake apply, the rotary to linear stage mechanism transfers torque into a linear force to move the brake piston and the brake pad against a brake rotor to create a clamp force, and
wherein the adjuster comprises a compression spring that is adapted to apply a load on the nut sleeve to restrict axial movement of the nut sleeve beyond a predetermined position in a direction away from the brake pad.

2. The brake system of claim 1, wherein the parking brake system comprises a ball and ramp assembly located between the rotary to linear stage mechanism and a moveable actuator for providing the torque to the rotary to linear stage mechanism, and wherein the spindle and the nut sleeve are at least partially received in a piston bore of the brake piston, and wherein the parking brake system comprises a second compression spring, the second compression spring is adapted to apply a load on the spindle against a ramp plate of the ball and ramp assembly.

3. The brake system of claim 2, wherein the actuator is moved by manually pulling a cable pull and tensioning a spring.

4. The brake system of claim 1, wherein the adjuster adjusts a position of the spindle relative to the nut sleeve by rotationally retracting the spindle out of the nut sleeve as the brake pad wears over time, and wherein the position of the spindle is adjusted during a brake apply.

5. The brake system of claim 1, wherein the brake pad is an inboard brake pad and the brake system includes an outboard brake pad an outboard brake piston, wherein the parking brake system includes a body having a bridge and fingers, the fingers are in communication with the outboard brake pad, wherein during the parking brake apply, the rotary to linear stage mechanism moves the brake piston and the inboard brake pad against the brake rotor and the bridge and fingers pull the outboard brake pad against the brake rotor, and wherein the outboard brake piston is located in between the fingers.

6. The brake system of claim 5, wherein the parking brake system includes a bracket, the bracket is fixed to a pressure plate of the outboard brake pad, the bracket includes arms that are adapted to wrap around the fingers to fix the fingers to the outboard brake pad.

7. The brake system of claim 5, wherein the brake piston is an inboard brake piston that is in communication with the inboard brake pad, wherein the inboard brake piston is directly opposed the outboard brake piston, wherein the fingers surround the outboard brake piston.

8. The brake system of claim 1, wherein the brake pad is an inboard brake pad, and the brake system includes an outboard brake pad, wherein the brake piston is an inboard brake piston that is in communication with the inboard brake pad, and the brake system includes an outboard brake piston, wherein the parking brake system includes a body having a bridge and fingers, and wherein during the parking brake apply, the rotary to linear stage mechanism transfers the torque into the linear force to move the inboard brake piston and the inboard brake pad against the brake rotor to create the clamp force and the bridge and fingers move the outboard brake pad against the brake rotor, and wherein during a standard brake apply, the inboard brake piston and the outboard brake piston are moved by pressurizing brake fluid.

9. An assembly comprising:
a brake system comprising:
  i. an inboard brake piston;
  ii. an inboard brake pad;
  iii. an outboard brake piston; and
  iv. an outboard brake pad comprising a pressure plate;
a parking brake system comprising:
  i. a rotary to linear stage mechanism in communication with the inboard brake piston;
  ii. an adjuster for adjusting the rotary to linear stage mechanism based on wear of the inboard brake pad, the outboard brake pad, or both; and
  iii. a body having a bridge and fingers, the fingers are in communication with the outboard brake pad;
  iv. a bracket, the bracket is connected to the pressure plate of the outboard brake pad, the bracket includes arms that are adapted to engage the fingers of the body to connect the fingers to the outboard brake pad;
wherein during a parking brake apply, the rotary to linear stage mechanism transfers torque into a linear force to move the inboard brake piston and the inboard brake pad against a brake rotor, and
wherein during the parking brake apply, the bridge and fingers move the outboard brake against the brake rotor.

10. The brake system of claim 9, wherein the parking brake system comprises an actuator for actuating the parking brake system and generating the torque, the actuator is actuated by manually pulling a cable pull.

11. The brake system of claim 10, wherein the rotary to linear stage mechanism comprises a spindle and a nut sleeve, the spindle is rotated when the actuator is actuated, and rotation of the spindle causes the nut sleeve to axially move the inboard brake piston and the inboard brake pad.

12. The brake system of claim 9, wherein the adjuster comprises a compression spring and a snap ring that cooperate to restrict axial movement of the nut sleeve while allowing the spindle to retract out of the nut sleeve as the inboard brake pad, the outboard brake pad, or both wear, and wherein the adjuster and the rotary to linear stage mechanism are at least partially received in a piston bore of the inboard brake piston.

13. The brake system of claim 12, wherein the parking brake system comprises a ball ramp assembly located between the actuator and the linear to rotary stage mechanism, and a second compression spring for applying a preload on the spindle to maintain the spindle in communication with the ball ramp assembly.

14. The brake system of claim 13,
wherein the outboard brake piston opposes the inboard brake piston.

15. The brake system of claim 14, wherein the brake system comprises two inboard brake pistons and two outboard brake pistons.

16. A method of applying the parking brake in the brake system of claim 1, the method comprising:
moving the brake piston and the brake pad with the rotary to linear stage mechanism; and
moving an opposing brake pad with fingers and a bridge.

17. The method of claim 16, wherein the brake piston is an inboard brake piston and the fingers are fixed to the opposing brake pad.

18. The method of claim 16, wherein the method includes a step of adjusting the parking brake system based on wear of the brake pad, the opposing brake pad, or both,
wherein the step of adjusting the parking brake system includes retracting a spindle of the rotary to linear stage mechanism out of a nut sleeve of the rotary to linear stage mechanism, and
wherein the step of adjusting the parking brake is performed during a step of applying a service brake.

19. An assembly comprising:
an opposed piston brake system comprising a caliper, the caliper supporting:

i. an inboard brake piston;
ii. an inboard brake pad;
iii. an outboard brake piston that directly opposes the inboard brake piston; and
iv. an outboard brake pad comprising a pressure plate;

a parking brake system comprising:
i. a rotary to linear stage mechanism in communication with the inboard brake piston, the rotary to linear stage mechanism comprising a spindle and a nut sleeve that are at least partially received into the inboard brake piston;
ii. a ball and ramp assembly;
iii. an adjuster comprising a first compression spring that is adapted to apply a load on the nut sleeve to restrict axial movement of the nut sleeve beyond a predetermined position in a direction away from the inboard brake pad;
iv. a second compression spring that is adapted to apply a load on the spindle against a ramp plate of the ball and ramp assembly;
v. a body having a bridge and fingers, the bridge extends over top of the caliper; and
vi. a bracket connected to the pressure plate of the outboard brake pad, the bracket includes arms that are adapted to engage the fingers of the body to connect the fingers to the outboard brake pad, the outboard brake piston is located in between the fingers.

20. The assembly according to claim 19, wherein the opposed piston brake system comprises a second outboard brake piston that is located adjacent to the outboard brake piston, the fingers of the body of the parking brake system surround only the outboard brake piston.

* * * * *